United States Patent [19]
Pettersson

[11] Patent Number: 6,073,526
[45] Date of Patent: *Jun. 13, 2000

[54] METHOD FOR CUTTING METAL REINFORCED HOSES, METAL PIPES AND SIMILAR, AND A DEVICE FOR UTILIZATION OF THE METHOD

[76] Inventor: Axel Börje Pettersson, Bieasen 56, Katrineholm, Sweden, S-641 96

[ * ] Notice: This patent issued on a continued prosecution application filed under 37 CFR 1.53(d), and is subject to the twenty year patent term provisions of 35 U.S.C. 154(a)(2).

[21] Appl. No.: 08/860,966
[22] PCT Filed: Dec. 27, 1995
[86] PCT No.: PCT/SE95/01588
§ 371 Date: Jul. 11, 1997
§ 102(e) Date: Jul. 11, 1997
[87] PCT Pub. No.: WO96/21542
PCT Pub. Date: Jul. 18, 1996

[30] Foreign Application Priority Data

Jan. 12, 1995 [SE] Sweden .................................. 9500096
Jul. 11, 1995 [SE] Sweden .................................. 9502568

[51] Int. Cl.[7] .............................. B26D 3/16; B23D 21/00
[52] U.S. Cl. .................................. 83/54; 83/178; 83/184; 269/47
[58] Field of Search ............................... 83/13, 178, 179, 83/180, 184, 188, 54; 269/47, 48.1, 49

[56] References Cited

U.S. PATENT DOCUMENTS 4,059,036 11/1977 Hartley ....................................... 83/188
4,467,508 8/1984 Fjallstrom ................................. 29/33 T
5,592,741 1/1997 Vassar ..................................... 83/178 X
5,675,096 10/1997 Hydemann et al. .................. 83/178 X

FOREIGN PATENT DOCUMENTS

| 66146 | 8/1914 | Austria ..................................... 83/178 |
| 1.233.591 | 10/1960 | France ..................................... 83/179 |
| 55-61429 | 5/1980 | Japan ..................................... 83/179 |
| 61-136713 | 6/1986 | Japan . |
| 62-39108 | 2/1987 | Japan . |
| 440876 | 8/1985 | Sweden . |

*Primary Examiner*—Clark F. Dexter
*Attorney, Agent, or Firm*—Jacobson, Price, Holman & Stern, PLLC

[57] ABSTRACT

Method for cutting preferably metal reinforced hoses, metal pipes or similar, and a device for utilization of the method, the cutting operation being performed in a known way using a cutting tool, such as a motor driven cutting disc or similar. As an initial step, a single unit (1) is located within and surrounded by the tubeshaped member (2) at with a central position in relation to the point where cutting is intended to be performed, the single unit (1) being arranged to take up sealing contact with the internal surface of the tubeshaped member (2) by at least two separated areas (4, 4') at each side of the cutting point. Cutting is thereafter performed through the tubeshaped member (2) as well as through the surrounded single unit (1), and the separated parts of the surrounded single unit (1) are as a final step pulled out from the tubeshaped member (2) in direction towards the end portions formed by the cutting operation.

7 Claims, 4 Drawing Sheets

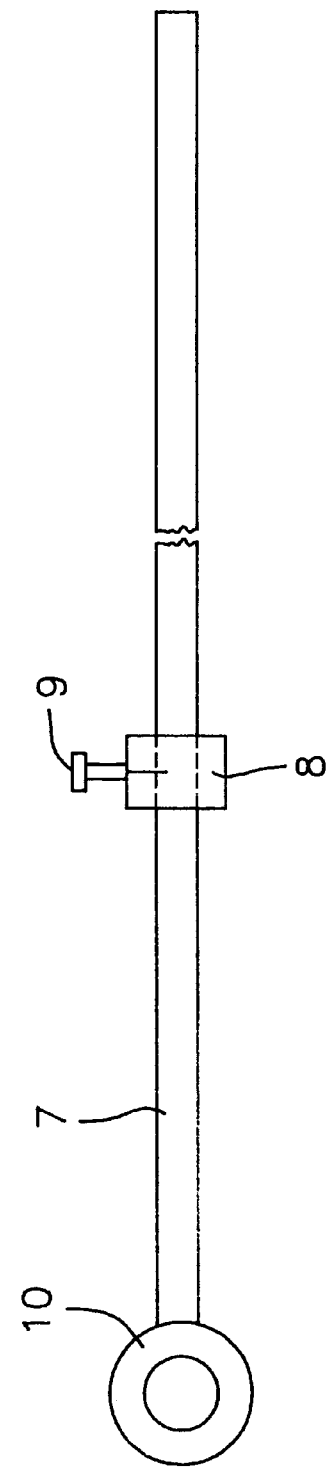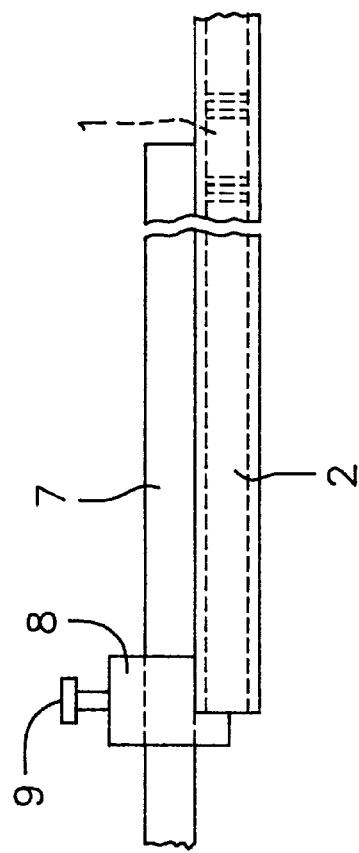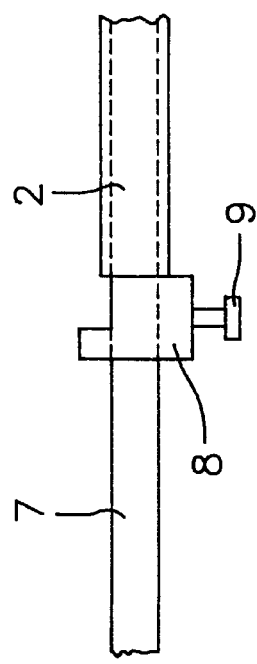

METHOD FOR CUTTING METAL REINFORCED HOSES, METAL PIPES AND SIMILAR, AND A DEVICE FOR UTILIZATION OF THE METHOD

TECHNICAL FIELD

The present invention relates to a method for cutting preferably metal reinforced hoses, metal pipes or similar, and a device for utilization of the method.

PRIOR ART

Cutting, for example, of hydraulic hoses in desired lengths is today normally performed by means of machinery having conventional cutting discs, which result in particles from the cut off hose being caught in the end portions of the hose adjacent to the cut surfaces. With regard to metal particles originating from the cut metal reinforcement, same have a high temperature when released during the cutting operation, and as a result, same can penetrate and be "melted" to the internal surface of the hose. In order to clean a cut off hose portion cut from particles released during the cutting operation, through blowing by means of air or high pressure cleaning with liquid is used, time and cost consuming operations which do not ensure complete security for complete cleaning of a cut off hose portion. This relates particularly to metal particles which completely or partly are embedded adjacent to the internal surface of the hose, and which later under use of the hose may be released and follow an enclosed hydraulic medium to piston cylinders, pumps, valves and other parts of a hydraulic system, thereby causing uncalled large damage through wear. The equipment required for high pressure cleaning is also expensive, and results in that cutting of hydraulic hose normally can not be carried out by a user.

SUMMARY OF THE INVENTION

The object of the present invention is to disclose a method for cutting preferably metal reinforced hoses, metal pipes or similar, avoiding the above discussed disadvantages. The method and the device according to the invention remove substantially completely the risk for penetration of non-desirable particles by the end portions formed at a cutting point, and the cut portion remaining by the stored part of the hose after cutting can be given a means of protection against penetration from outside particles during a subsequent storage period. Furthermore, the method and device according to the invention facilitate that previous clean blowing and washing operations are no longer required, whereby a user is offered a possibility to himself perform cutting of desired lengths.

In the method according to the present invention for cutting preferably metal reinforced hoses or similar, the cutting operation is performed in a conventional way using a cutting tool, such as a motor driven cutting disc or similar, the method according to the present invention being substantially characterized in that a means as a first step is located surrounded by the element to be cut in a central position in relation to the point where cutting is intended to be performed, that said means is arranged to take up intimate contact with the internal surface of the element by at least two individually separated areas at each side of the cutting point, that cutting is thereafter performed through the element as well as the surrounded means, and that as a final step from each other separated parts of the surrounded means are extracted from the element in direction towards the end portions formed by the cutting operation.

The device for utilization of the method according to the present invention is mainly characterized in that the means to be located by the point where cutting is intended to be performed includes a central body, having an external diameter corresponding to or smaller than the internal diameter of the element to be cut off, each side including a group with one or a number of resiliently flexibly deflecting circular flanges having a diameter corresponding or slightly exceeding said internal diameter, at least one end portion of the means; being arranged with a preferably centrally located means for guidance or engagement with a device which by means of pushing or pulling influence is intended to locate the means in a central position in relation to the point where the element is intended to be cut.

BRIEF DESCRIPTION OF THE DRAWINGS

FIG. 5 shows a side view of an example of a device intended to facilitate insertion of the device shown in FIGS. 1–3 to the position shown in FIG. 1;

FIGS. 6A and 6B disclose how a stop device included in FIG. 5 can be modified to serve as a stop device according to FIG. 6A when inserting a device according to the invention into a hoseshaped part, and how same according to FIG. 6B facilitates location of correct cutting point;

METHOD TO CARRY OUT THE INVENTION

The method according to the present invention will initially be described, same being based on that a means, as a complete unit denominated 1, being inserted into the hoseshaped member 2 to be cut off. The means 1 is arranged, at least adjacent to its end portions, to take up intimate contact with the internal surface of the hoseshaped member 2, and to be located with its central portion at an intended cutting point. The hoseshaped member 2 is thereafter cut in a conventional way by use of a cutting disc or similar, and as a result, the means 1 inserted into the hoseshaped member 2 is also cut into two parts. The part of the means 1 existing in the part cut off into desired length is thereafter removed, whereas the part existing in the hoseshaped member 2 can remain as protection against dirt, until a new cutting operation should be performed.

Figure 1:
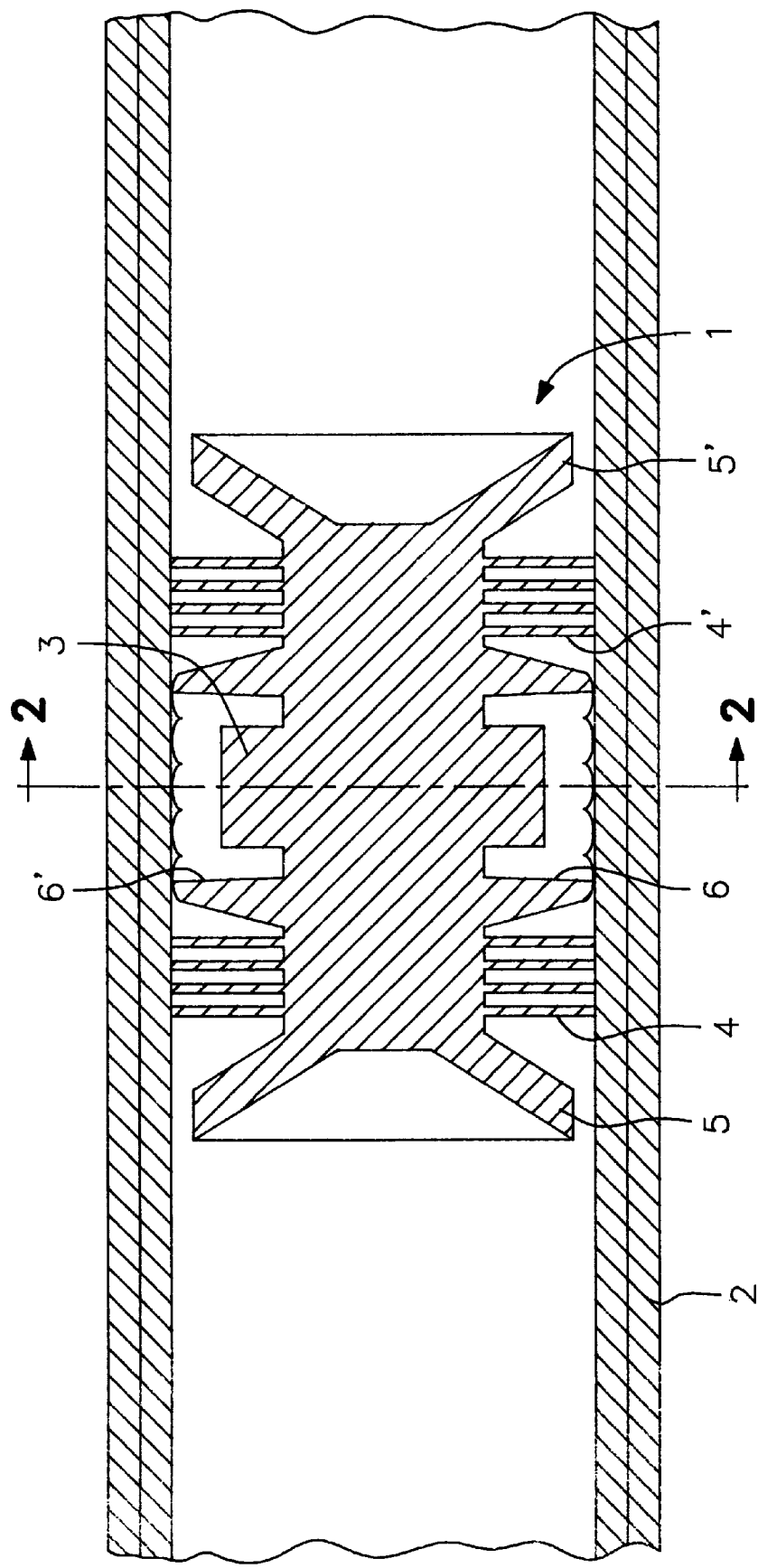
FIG. 1 shows a view in longitudinal section of an example of an embodiment of a device according to the present invention, located surrounded by a metal reinforced hydraulic hose to be cut.

With reference to FIG. 1, an example of how said means can be designed is shown. It comprises a central body 3 having a waveshaped external surface, formed by means of adjacently located convex surfaces. The central body 3 has an external diameter which corresponds to, or preferably is slightly less than, the internal diameter of the hoseshaped member 2 intended to be cut. The respective sides of the central body 3 are arranged with groups 4, 4' of externally directed circular flanges. In the shown embodiment, each group 4, 4' comprises of four flanges, but the number in each group 4, 4' can be chosen from a single flange to desired larger number, whereas a number exceeding one flange in each group 4, 4' is preferred. Furthermore, the circular flanges have an external diameter which substantially corresponds to, or preferably slightly exceeds, the internal diameter of the hoseshaped. member 2.

Figure 2:
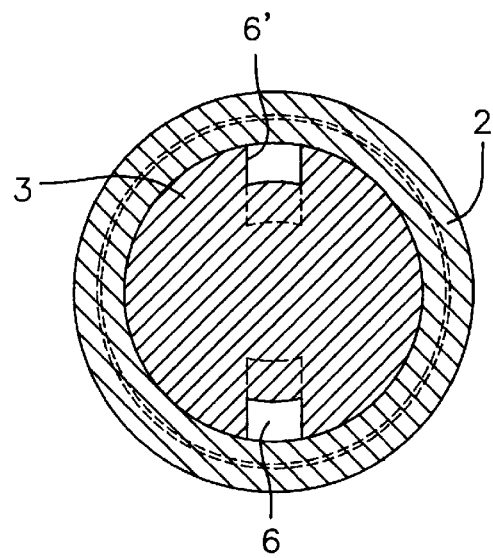
FIG. 2 shows a cross-sectional view at II—II in FIG. 1.
Figure 3:
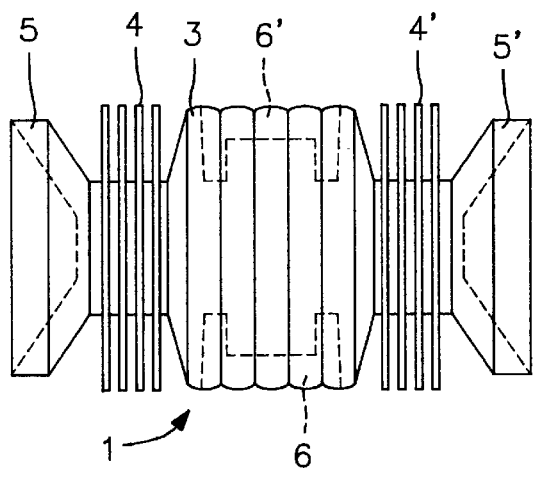
FIG. 3 shows a side view of the device shown in FIG. 1.

The outer end portions of the means 1 in the example of an embodiment shown in FIGS. 1–3 are arranged as outwardly open and substantially funnel shaped members 5, 5', having an outer diameter smaller than the internal diameter of the hoseshaped member 2. Furthermore, the central body 3 has two opposed grooved portions 6, 6', arranged with parts having a larger depth adjacent to the end portions of the grooved portions 6, 6'.

The above briefly described example of an embodiment of a device according to the present invention can be used in connection with a longitudinally extending rodshaped member 7 (FIG. 5), onto which a stop means 8 is slidably arranged, lockable in relation to the rodshaped member 7 in desired relative position by means of a lock screw 9. The rodshaped member 7 is advantageously arranged as shown having a handle or gripping member 10 adjacent to an end portion. With regard to the embodiment shown in FIG. 5, the stop means 8 has advantageously a side extension (in the longitudinal direction of the rodshaped member 7) which substantially corresponds to half the distance between the bottom surfaces of the funnel shaped members 5, 5'.

When performing a cutting operation, the stop means 8 is slid along the rodshaped member 7 to a position, in which the distance from the side surface of the stop means 8 which is most adjacent to the free end portion of the rodshaped member 7 (opposed to the handle or gripping member 10) corresponds to a desired cut off length for a hoseshaped member 2 reduced by half the distance between the bottom surfaces of the funnel shaped members 5, 5'. Provided that the stop means as previously described is arranged with a width corresponding to this half distance, the chosen distance will thus correspond to the distance from said free end portion to the side of the stop means 8 which is facing the handle or gripping member 10, and as a result, the rodshaped member 7 can be arranged with a graded scale which can be read to simplify the setting (not shown). The stop means 8 is thereafter locked in position in relation to the rodshaped member 7 by means of the lock screw 9.

The means 1 is thereafter inserted into the open end portion of the hoseshaped member 2, whereafter same by assistance of the rodshaped member 7 is slid to a position in which the stop means 8 takes up contact with the end portion of the hoseshaped member 2. The means 1, which preferably is manufactured from a synthetic plastic material having flexible and resiliently compressible properties, takes up intimate contact with the internal surface of the hoseshaped member 2 with the outer peripheral portions of the flanges included in the groups 4, 4', which preferably slightly bend during the insertion, and thus resiliently contact said internal surface. The circular flanges of the groups 4, 4' thus act as sealing means in contact with the internal surface of the hoseshaped member 2, with the groups 4, 4' restricting the point where cutting is to be performed (intended cutting point corresponds to the line II—II in FIG. 1). In order to reduce the frictional resistance during insertion, the central body 3 can as shown in FIGS. 1 and 3 be arranged having a surface formed by adjacently located convex surfaces, but also other area restricting surfaces, e.g. a waveshaped surface, can obviously be chosen, as well as a diameter which is close to but not exceeding the internal diameter of the hoseshaped member 2.

When the means 1 has been inserted into intended position within the hoseshaped member 2, the rodshaped member 7 is advantageously used for external determination of the point where cutting is to be performed. With regard to the rodshaped member 7 described with reference to FIG. 5, same is placed outside the hoseshaped member 2 with the surface of the stop means 8 facing the handle or gripping member 10 in line with the end surface of the hoseshaped member, whereby the free end portion of the hoseshaped member 7 indicates location for the cutting point. When the located point has been marked, cutting is performed in a conventional manner by means of a cutting disc or similar.

The particles released during the cutting operation in direction towards and into the hoseshaped member 2 are restricted by means of the central body 3, and sideways by means of the discshaped flanges in the groups 4, 4'. The central body 3 is cut off (at the intersecting line II—II in FIG. 1) when the hoseshaped member 2 is cut off, and after completed cutting operation halves of the means 1 remain in each end portion of the hoseshaped member 2. With regard to the end portion associated with the measured and cut off part, the half of the means 1 remaining in the end portion cut off is now removed. This can be carried out using a tweezeracting tool, having the free end portions bent in direction towards each other. These free end portions are inserted into the now open grooved portions 6, 6', and thereafter squeezed together, whereby the towards each other directed end portions engage with the end portions having a larger depth. The tool can thereafter be used to extract the remaining part of the means 1, the associated group, 4 or 4', of discshaped flanges at the same time removing existing particles in the end portion of the hoseshaped member 2 by means of a scraping operation against the internal surface of the hoseshaped member 2. The means 1 has thus prevented such particles to penetrate into the hoseshaped member 2 past the groups 4, 4' of flanges during the cutting operation, and also performed a cleaning operation during the removal operation. The part of the means 1 remaining in the other part of the hoseshaped member 2 can advantageously be left remaining until a new part should be cut off, and serves thereby as a seal preventing dirt and other impurities from entering during storage until a new hosepart should be cut off.

It should also be mentioned, that the embodiment shown in FIGS. 1–3 has been shown having a funnel shaped part 5, 5' by each end portion, even though same is only intended to act as a guiding means for the free end portion of the rodshaped member 7. One of the funnel shaped parts 5, 5' can obviously removed, since the part first inserted into a hoseshaped member 2 in fact is not used. However, the shown embodiment has been designed totally symmetrical, which means that any desired end portion can be inserted as a first end portion into a hoseshaped member 2.

Figure 4:
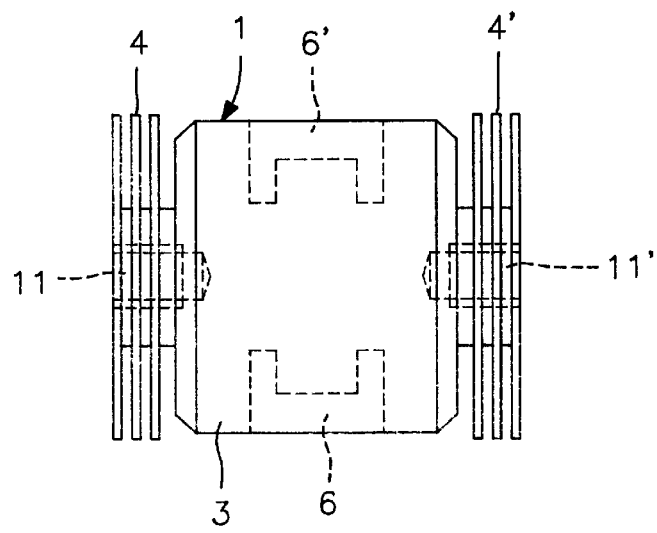
FIG. 4 shows a modified embodiment in relation to the example of an embodiment shown in FIGS. 1–3.

FIG. 4 shows an example of a modified embodiment, in which the central body 3 has been arranged without any area restricting means which reduce frictional resistance in relation to the internal surface of a hoseshaped member 2. In such an embodiment, a condition is that the diameter of the central body 3 is smaller than the internal diameter of related hoseshaped member 2. Furthermore, previously discussed funnel shaped parts 5, 5' do not exist, replaced by centrally located threaded blind holes 11, 11'. These blind holes have preferably such a restricted length that they do not communicate with the cut surface of the means 1 after a completed cutting operation, since otherwise particles or other impurities may enter past the means 1 into the hoseshaped member 2. These threaded blind holes 11, 11' facilitate alternative attachment possibilities for the device utilized to locate the means 1 at desired cutting point in a hoseshaped member 2. For example, a longitudinally extending rodshaped member 7 can be used, having the free end portion arranged with an external screw thread, which can be connected to the means 1. Alternatively, such a threaded blind hole 11, 11' can be used for attachment of a guiding member, against the free end portion of which previously described rodshaped member 7 can be pressed. In such a case, the attached guiding member can be removed after completed operation, and reused repeated number of times.

Furthermore, the above described threaded blind holes 11, 11' can also be used for attachment of a threaded means, intended to be joined to a wire, in order to facilitate cutting of long lengths of hoses. Such a wire can be moved through a hose- or tubeshaped member 2 from which a length should be cut off, and after attachment to a means according to the invention be used to pull same to desired position. Measurement of the length to be cut can be performed by measuring a corresponding length of wire fed out from the point when the central part of the means 1 according to the invention is located at the end portion from which insertion is performed. Hereby very long lengths of hose can be cut off, having lengths which would make a rodshaped member 7 less suited as inserting device. The part of the means 1 which remains in the hoseshaped member 2 after the cutting operation, joined to the wire, can be pulled out with a tool in previously described fashion, whereafter the wire can removed.

With regard to the embodiment shown in FIG. 4, same is shown symmetrical, i.e. with a threaded blind hole 11, 11' extending from both end surfaces, but for most cases of application, only one such threaded blind hole 11, 11' is normally required.

Obviously, also other types of attachment means or guiding means apart from funnel shaped parts 5, 5' or threaded blind holes 11, 11' can be used, e.g. loop-shaped members joined to or integrated with the means 1 according to the invention.

FIGS. 6A and 6B show an example of modification with regard to the stop means 8 described with reference to FIG. 5, in order to simplify measurement to the cutting point when the means 1 according to the invention has been positioned. The stop means 8 is arranged substantially L-shaped in the modified embodiment, the base being utilized as a means of abutment against the end portion of a hoseshaped member (FIG. 6A) when a means 1 is inserted. When this operation has been completed, the longitudinally extending rodshaped member 7 is placed outside on the hoseshaped member 2, with the part extending from the base of the stop means 8 serving as an abutment member against the end surface of the hoseshaped member 2. The distance between the two abutment surfaces on the stop member have been chosen in such a way, that it corresponds to the distance from the contact point for the rodshaped member 7 with the means 1 to the center of the means 1, whereby the end portion of the rodshaped member 7 when measuring according to FIG. 6B thus is located at the point where cutting is to be performed. By this modification of the stop means 8, location of the cutting point can be performed quicker and safer in relation to what has been described with reference to the stop means 8 shown in FIG. 5.

It should also be emphasized, that the means 1 according to the present invention obviously can be modified in a number of ways, while maintaining the features of the inventive thought. As an example may the shown and in relation to each other opposed groove shaped members 6, 6' be arranged in an increased number, e.g. a larger number and preferably angularly equally spaced from each other. Alternatively may an internally threaded tubular part having a length preferably less than the central body 3 be cast within same, in order to facilitate attachment to an externally threaded part of a removal tool after completed cutting operation. As previously mentioned, the number of flange shaped parts in each group 4, 4' can also be varied, basically from only one flange shaped part in each group 4, 4' to a desired larger number. A larger number of flange shaped parts obviously result in improved security against particles penetrating or remaining, but at the same time required force for insertion or location of the means according to the invention is increased, and also for removing same after completed cutting operation.

Figure 7:
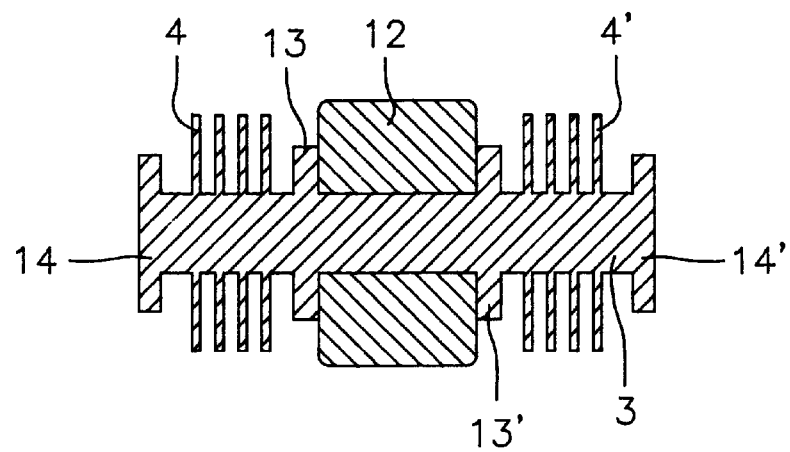
FIG. 7 shows a view in longitudinal section of a further example of an embodiment according to the present invention.

With reference to FIG. 7, a further example of how a means according to the invention can be designed is shown. This modified embodiment includes a central body 12, which is manufactured from an elastically compressible material, for example foam rubber or foam plastic. The central body 12 has an external diameter which substantially corresponds to, or preferably slightly exceeds, the internal diameter of the hose- or pipeshaped member intended to be cut. The central body 12 is located on a longitudinally extending supporting body 3, restricted on each side by a discshaped member 13, 13', extending from the longitudinally extending body 3, which are followed in direction towards each end portion of said body 3 by groups 4, 4' of outwardly directed circular flanges. In the shown embodiment, each group 4, 4' comprises four flanges, but the number within each group 4, 4' can be chosen from a single flange to desired larger number, in which case a number exceeding one flange in each group 4, 4' is preferred. Furthermore, the circular flanges 4, 4' are arranged having an external diameter which substantially corresponds to, or preferably slightly exceeds, the internal diameter of the hose- or tubeshaped member. Previously mentioned discshaped members 13, 13', which serve as means for locating and holding the central body 12 in position, have an external diameter smaller than the diameter of the flanges 4, 4'.

Figure 8:
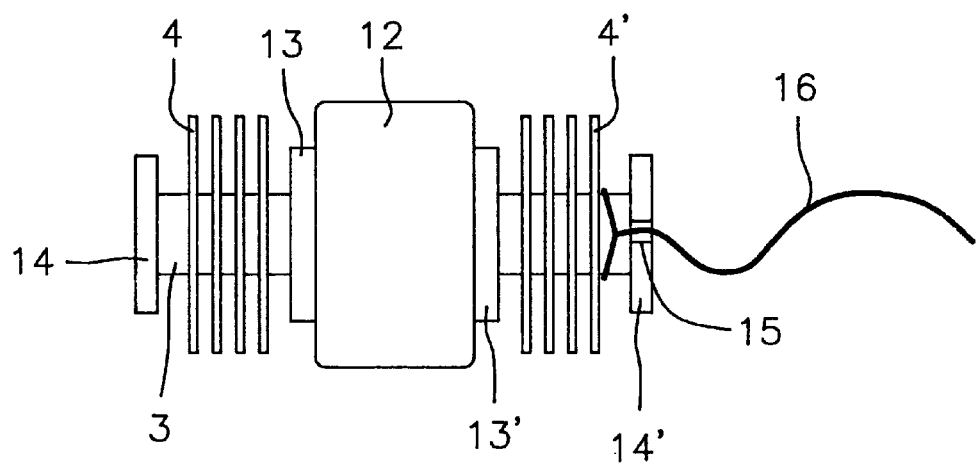
FIG. 8 shows a side view of the embodiment shown in FIG. 7 with an example of how a string shaped member can be attached.

In the example of an embodiment shown in FIGS. 7–8, the outer end portions of the supporting body 3 are arranged with an outwardly extending flange 14, 14', intended to serve as a means of attachment when applying the device within a hose or tubeshaped member. It should be noted, that even though such a flange 14, 14' is shown by each end portion, only one will be used, i.e. the device can thus also be designed having a suitably designed means of attachment by one end portion only. Furthermore, the means of attachment can be designed in a number of ways, e.g. as a centrally located blind hole extending from at least one end surface of the longitudinally extending supporting body, threaded or non-threaded, for connection with a screw shaped member, having, for example, a loop shaped outer portion.

FIG. 8 shows how a flange 14, acting as a means of attachment, also can be arranged with one or a number of radially extending through slots 15, intended to simplify connection of a string shaped member 16, the operation of which will be discussed later.

With reference to the embodiment shown in FIGS. 7 and 8, application at desired cutting point can obviously be performed by means of a pushing rodshaped means, e.g. as previously described. However, such a method of application may present problems, particularly when long lengths of hose or tube should be cut off, since that would result in difficulties when inserting the device to desired point of cutting.

According to a modification of the method according to the invention a string shaped means 16 is attached adjacent to an end portion of the device, e.g. as shown in FIG. 8. This end portion will serve as a final end portion during an insertion operation, i.e. in FIG. 8 the direction of insertion will be towards the left hand side of the drawing. The device is manually inserted in one end portion of the hose- or tubeshaped member to be cut, and the free length of the string shaped means 16 is measured to the length to be cut off, reduced by the distance from the point of attachment to the device to the central part of same (approximately half the length of the device). At the final point of the string shaped means 16 is a stop means attached, e.g. a plate shaped member having a hole for the string shaped means 16, and with a lock screw extending preferably perpendicular to said hole, whereby the string shaped means 16 can be locked in desired position. Said string shaped means 16 can, for example, consist of a nylon string of the type used for sport fishing.

When the above described steps have been completed, a rubber sleeve or similar connected to a compressed air source is applied by the end portion of the hose- or tubeshaped member into which the device has been initially inserted. Due to the pneumatic pressure from the compressed air the device is rapidly moved through the hose- or tubeshaped member to be cut off, until a point is reached when the stop means by the free end portion of the string shaped member 16 by contact with the end portion of the hose- or tubeshaped member restricts and prevents a further sliding movement. Obviously, the stop means and previously mentioned sealing rubber sleeve or similar can advantageously be designed as one unit in order to accomplish simplified and quicker handling.

When the device according to the invention has been located at the cutting point, a cutting operation is performed in a conventional way, e.g. with a motor driven cutting disc.

During the cutting operation, the central elastical body 12 will in an extremely good fashion catch the particles released during the cutting operation. These often have high temperature, and are bedded into said body 12. That same also serves as a sealing means during pneumatical movement to intended cutting point is obviously a further advantage. After completed cutting operation, the part of the central body 12 remaining at the end portion of the cut off part to be used is removed, and its supporting flange, 13 or 13', can easily be gripped by a pinching tool or similar, whereby also the central supporting body 3 can be pulled out.

The above described pneumatical movement can obviously also be performed by connection of a vacuum source at the end portion of the member to be cut opposed to the end portion in which the device according to the invention is inserted. Obviously can also pneumatical movement be applied with regard to the examples of embodiments which are described with reference to FIGS. 1–4.

The half device existing at the end portion of the hose- or tubeshaped member not to be used, from which cutting has been performed, nay advantageously remain as a protective and sealing part during storage.

A further improved particle absorbing action can be obtained by applying a surrounding layer of grease on the device before same is inserted into a hose- or tubeshaped member.

Figure 9:
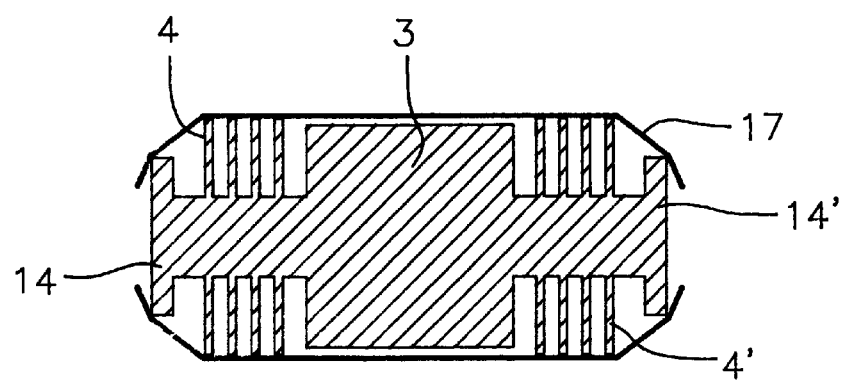
FIG. 9 shows a view in longitudinal section of a further modified embodiment of a device according to the invention.

FIG. 9 shows an example of an embodiment substantially similar to what has been described with reference to FIGS. 1 and 2, i.e. with a central member 12 integrated with the supporting body 3. It is further disclosed how an elastical tubular stocking 17 of woven gauze (tubular gauze ribbon) or similar material is located surrounding the device. Such a modification can obviously also be applied for the embodiment according to FIGS. 1 and 2. Hereby is a further improved particle absorbing ability accomplished. Application of a grease layer can obviously also be performed for the embodiment according to FIG. 9, alternatively inside or outside the stocking 17, or inside as well as outside.

Even though not shown in the drawings, the device can consist of two joined parts, in order to simplify manufacture of same. There are a number of possible ways for joining such parts, e.g. by means of a threaded connection, snap-in connection, bayonet coupling or bonded by glue. Basically, the joint can a studshaped member co-acting with a hole in the other part, and with the studshaped member arranged to fit with a press fit in the hole. In view of the fact that it is obvious to a person skilled in the art that many known solutions can be used, also including division into more than two parts joined together (e.g. with a centrally located tubular member, against which two outer parts are insertable and attachable), a further description of how division can be performed is not believed necessary. Obviously will division into at least two parts simplify the installation of the centrally located elastically compressible body 12.

The method according to the present invention, and the examples of modifications described intended to improve application (pneumatical application) of the device, as well as the particle absorbing ability (elastically compressible central member, surrounding tubular stocking of gauze ribbon or similar, and application of a grease layer), can obviously be performed in connection with the embodiments described with reference to FIGS. 1–4. With regard to the embodiment shown in FIGS. 7 and 8, same also offers a simplified attachment means when extracting the halves of the device after completed cutting operation in relation to previously described examples of embodiments.

The method according to the invention, and the device for utilization of the method, can thus in no way be regarded to what has been shown and described, and may thus be further modified in a number of ways within the scope of the inventive thought and the following claims.

As an example of a further modification can be mentioned the possibility as a preoperation, or in combination with the insertion of a device according to the invention, perform a cleaning operation of the internal surface of the element to be cut. By inserting a brush-shaped and/or elastically compressible wiping means prior to the device according to the invention, existing smaller particles within the element to be cut off can be removed. Such a brush-shaped and/or elastically compressible wiping means can alternatively be inserted during a separate preoperation, or alternatively be a leading part at a device according to the invention, joined thereto or as an individual loose unit, which is moved by pressure force from the device according to the invention.

Hereby is a further improved cleaning accomplished for the internal surface of the element to be cut off.

Industrial Applicability

The method and the device according to the present invention replaces machinery of complicated and expensive type, and facilitates cutting of, for example, metal reinforced hydraulic hose at a user. Previously required flushing and cleaning operations after a completed cutting operation are unnecessary, and the present invention results in that a cut off element is maintained clean from impurities from the cutting operation. The part which should not be used receives automatically an end seal, which prevents outside impurities from entering, e.g. during storage. Furthermore, time consumption and cost for a cutting operation is considerably lower than what has previously been regarded as possible.

What is claimed is:

1. Method for cutting metal reinforced hoses, in which a cutting operation is performed with use of a cutting tool, said method comprising:

locating, as a first step, a single unit within and surrounded by a metal reinforced hose to be cut, said cut to be located at a single cutting point on the metal reinforced hose and at a central portion of said single unit, said unit being arranged in contact with an internal surface of the metal reinforced hose by two separated sections of the unit located at each side of the single cutting point, the unit having at least portions of said two sections with a diameter greater than an internal diameter of said metal reinforced hose, after said locating step, cutting through the metal reinforced hose as well as the surrounded unit at the single cutting point to divide the two sections of the unit and divide the metal reinforced hose into two parts, and as a final step, sweeping all debris from within the metal reinforced hose by extracting the two sections of the surrounded unit from the two parts of the metal reinforced hose in a direction towards end portions of the metal reinforced hose formed by the cutting operation such that said portions sweep against the internal surface of said metal reinforced hose.

2. Method according to claim 1, wherein the locating step includes moving the unit to the cutting position by pushing the unit with a longitudinally extending rodshaped member having a slidable and lockable adjustable stop, wherein the adjustable stop is positioned on the rodshaped member such that the stop contacts an end surface of the metal reinforced hose when the unit has been located in the cutting position, and wherein the pushing step is performed until the adjustable stop contacts the end surface of the metal reinforced hose.

3. Method according to claim 2, further comprising, after the locating step, positioning the longitudinally extending rodshaped member in a along an external surface of the metal reinforced hose to determine a position of the cutting point.

4. Method according to claim 1, wherein a string shaped member is attached to the unit, and wherein the locating step includes extending the string shaped member through the metal reinforced hose to be cut, and pulling the string shaped member through the metal reinforced hose to pull the unit to the cutting position.

5. Device in combination with a metal reinforced hose for cutting the metal reinforced hose, the reinforced hose having an internal diameter, said device comprising:

a unit located at a point where the metal reinforced hose is to be cut, the unit including;

a central body including an outer grooved portion having outer grooves therein, said outer grooved portion having an external diameter corresponding to or smaller than the internal diameter of the metal reinforced hose;

two sides, with each side extending from said central body and having a group of at least one resiliently flexible deflecting circular flange having a diameter corresponding to or exceeding the internal diameter of the metal reinforced hose, and two end portions, each end portion extending from a respective one of the sides, at least one of the end portions including a centrally located member for, by pushing or pulling influence, locating said central body of said unit in a central position in relation to the point where the metal reinforced hose is to be cut, said central body also including an inner grooved portion having a lesser diameter than said outer grooves of said central body, whereby after cutting through of the unit has been completed, the lesser diameter inner grooved portion facilitates engagement with a tool so that cut off portions of the unit having the central body can be extracted from end portions of the metal reinforced hose formed by cutting.

6. The combination according to claim 5, wherein the central body has at least two of said outer grooves, said grooves being located on opposite sides of a longitudinal center of the device.

7. The combination according to claim 5, wherein the centrally located member includes an open funnel shaped part for receiving a pushing longitudinally extending member when the unit is located in a position surrounded by the metal reinforced hose to be cut.

* * * * *